United States Patent
Tsutsui et al.

(10) Patent No.: US 7,144,656 B2
(45) Date of Patent: Dec. 5, 2006

(54) ALKALINE BATTERY SEALING GASKET AND SEALED ALKALINE BATTERY

(75) Inventors: Kiyohide Tsutsui, Shizuoka (JP); Norihisa Watanabe, Aichi (JP); Itsue Yoshioka, Shizuoka (JP); Yuji Tsuchida, Shizuoka (JP)

(73) Assignee: FDK Energy Co., Ltd., Shizuoka (JP)

( * ) Notice: Subject to any disclaimer, the term of this patent is extended or adjusted under 35 U.S.C. 154(b) by 0 days.

(21) Appl. No.: 11/211,364

(22) Filed: Aug. 25, 2005

(65) Prior Publication Data

US 2006/0024576 A1     Feb. 2, 2006

Related U.S. Application Data

(63) Continuation of application No. PCT/JP04/02103, filed on Feb. 24, 2004.

(30) Foreign Application Priority Data

Feb. 25, 2003  (JP)  ............... 2003-047161

(51) Int. Cl.
    *H01M 2/08* (2006.01)
(52) U.S. Cl. .......................... 429/171; 428/43
(58) Field of Classification Search .............. 428/43, 428/156, 910; 429/171, 173
    See application file for complete search history.

(56) References Cited

FOREIGN PATENT DOCUMENTS

| JP | 56-132765 A | 10/1981 |
|---|---|---|
| JP | 61-133552 A | 6/1986 |
| JP | 63-166140 | 7/1988 |
| JP | 2-201865 A | 8/1990 |
| JP | 7-105925 | 4/1995 |
| JP | 2002-251987 | 9/2002 |

*Primary Examiner*—Alexander S. Thomas
(74) *Attorney, Agent, or Firm*—Harness, Dickey & Pierce, P.L.C.

(57) ABSTRACT

An alkaline battery sealing gasket 33 made of a resin, comprises a peripheral packing portion 36 sandwiched in a pressed state between an opening end of a metal battery can 11 that contains an electricity generating element 20 and doubles as a positive electrode terminal and a negative electrode terminal 32 so as to seal the opening end with an airtight manner; and an isolation wall portion 37 for isolating a space on a back side of the negative electrode terminal from a space containing the electricity generating element, wherein in the isolation wall portion, a thinner portion 38 to break open earlier due to increases in gas pressure in the containing space to function as a safety valve is formed groove-like. A groove direction of the thinner portion 38 is in the same direction as an orientation of the resin of the gasket, and an Izod impact value of the resin forming the gasket is in a range of 20 to 60 J/m (at a temperature of 23±2° C. and a relative humidity of 50±5%).

5 Claims, 2 Drawing Sheets

ALKALINE BATTERY SEALING GASKET AND SEALED ALKALINE BATTERY

CROSS-REFERENCE TO RELATED APPLICATIONS

This application is a continuation of the International Application No. PCT/JP2004/002103 filed on Feb. 24, 2004 designating the United States of America.

BACKGROUND OF THE INVENTION

1. Field of the Invention

The present invention relates to an alkaline battery sealing gasket and a sealed alkaline battery, and particularly to a technology effective when applied to an alkaline dry battery having an anti-burst function.

2. Description of the Related Art

Alkaline dry batteries commonly called by their type name such as AM contain an electricity generating element in their metal battery can that doubles as a positive electrode terminal and the opening of the battery can being sealed by their negative electrode terminal and resin sealing gasket. The sealing gasket has a peripheral packing portion and an isolation wall portion. By the peripheral packing portion being sandwiched in a pressed state between the opening end of the battery can and the negative electrode terminal, the opening of the battery can is sealed in an airtight manner. The isolation wall portion isolates a space on the back side of the negative electrode terminal from a space containing the electricity generating element. By forming a thinner portion into groove-like in the isolation wall and breaking down the thinner portion earlier with a gas pressure increase in the containing space, a safety valve function to prevent increases in gas pressure from causing a burst of the battery can be achieved. By this means, an anti-burst, sealed alkaline battery can be made. See, for example, Japanese Patent Application Laid-Open Publications No. 07-105925 and No. 2002-251987.

In terms of maintaining the high sealability of the alkaline dry battery for a long time, it is considered preferable that the sealing gasket is excellent in both flexibility and impact resistance as well as alkaline resistance. Hence, an olefin-based resin is adopted as the material of the gasket. In particular, a polypropylene (hereinafter, PP) resin is considered a useful material excellent in moldability as well, but is somewhat deficient in terms of impact resistance. In order to solve this problem, a PP resin with its degree of crystallization increased and a PP resin with a rubber-based resin added have been used.

The impact resistance of resins used for the sealing gasket is evaluated in terms of an Izod impact value (Izod impact test value) according to a JIS-K7110-1984 measurement method. In general, firm materials are brittle, and soft materials have viscosity. For resins (plastics), the Izod impact value is often used as an index to evaluate the tenacity of these materials.

The Izod impact value indicates the magnitude of impact energy absorbed by a material (resin) under test, and is small for brittle materials and large for viscous materials.

In order to maintain the high sealability of the alkaline dry battery for a long time, a resin flexible and excellent in the capability of impact absorbing, that is, a flexible resin with a high Izod impact value is desirable. Hence, for conventional alkaline battery sealing gaskets, a PP resin having the Izod impact value increased to 80 or greater has been used as described in, for example, Japanese Patent Application Laid-Open Publication No. 63-166140.

However, it was revealed by the inventors that there is the following problem with the above conventional technology.

That is, with the sealing gasket having the safety valve function by a thinner portion, the safety valve function is activated with the thinner portion breaking open due to increases in gas pressure inside the battery. With a conventional sealing gasket having the safety valve function using a high impact-resistant resin (having an Izod impact value of 80 or greater), the activation property of the safety valve function in response to a rapid increase in gas pressure inside the battery is favored, but when the pressure inside the battery gradually increases, a creep phenomenon of the resin occurs, and thus the safety valve function may not be certainly activated. In other words, it was revealed that the problem occurs that the activation property of the safety valve function is poor thus increasing the risk of battery burst.

The creep in this case is a property characteristic of resins (plastics), and is a phenomenon that the deformation amount gradually increases as a constant force continues to be applied for a long time. In a metallic molded resin, molecules are oriented in the flow direction of the resin being injected into the metallic mold, and the creep phenomenon of the thinner portion appears to a greater degree in the oriented direction. Hence, the thinner portion is desirably formed so as to break open along the oriented direction, and to do that, the thinner portion is desirably formed by a groove extending in the same direction as the oriented direction. Even in this case, however, in order to make sure that the thinner portion breaks open at a predetermined gas pressure, the resin needs to be made brittle, that is, its Izod impact value needs to be made low.

However, if a brittle resin having a low Izod impact value is used, the original function of the sealing gasket, particularly the sealing function at the peripheral packing portion is reduced in effect. Thus, the contradiction arises that the high sealability of the battery cannot be maintained for a long time. While the sealing gasket can seals the battery can airtight by its peripheral packing portion being sandwiched in a pressed state between the opening end of the battery can and the negative electrode terminal, the quality of sealing function is greatly depending upon the flexibility of the resin. It has been considered that if a quality sealing function is required for the sealing gasket, the resin that is the material for it must have flexibility and be a high impact-resistant resin (PP) having at least an Izod impact value of 80 to 100.

Meanwhile, when the safety valve is of interest, it is found that the high impact-resistance is not necessarily useful to the activation property of the safety valve function, but rather hurts its activation property. In other words, with alkaline battery sealing gaskets, there is a contradiction between the sealing function to maintain the high sealability of the battery for a long time and the safety valve function to certainly prevent battery burst. However, this has not been considered to be a problem conventionally. This is supposedly because when testing the activation of the safety valve function, gas pressure inside the battery was rapidly increased. In the case of the alkaline dry battery, a test of the safety valve function can be performed where by forcing a charge current to flow the battery, reactant gas is generated inside the battery. In order to perform this test efficiently, the gas generation speed needs to be increased by forcing a large charge current to flow. As such, by rapidly increasing gas pressure, the test can be performed efficiently in a short time, but by this means, the activation property in which the gas pressure gradually increases cannot be examined.

The inventors have acquired knowledge that the activation of the safety valve function is greatly different depending on how the gas pressure increases and even if the gas pressure rapidly increases with a quality activation property, the activation property becomes worse when the gas pressure increases gradually. That is, it has become apparent that with the above conventional alkaline battery sealing gaskets, there is the problem that the sealing function to maintain the high sealability of the battery for a long time and the activation property of the safety valve function for when gas pressure inside the battery gradually increases are not compatible.

SUMMARY OF THE INVENTION

The present invention was made in view of the above problem. An object thereof is to provide an alkaline battery sealing gasket wherein the safety valve function to prevent a burst of the sealed alkaline battery is certainly activated even when gas pressure inside the battery gradually increases and wherein the high sealability of the battery is maintained for a long time, and to provide a sealed alkaline battery that is excellent in anti-burst and anti-liquid leakage through using this sealing gasket.

According to the present invention, there is provided an alkaline battery sealing gasket made of a resin, comprising a peripheral packing portion sandwiched in a pressed state between an opening end of a metal battery can that contains an electricity generating element and doubles as a positive electrode terminal, and a negative electrode terminal so as to seal against the opening end in an airtight manner; and an isolation wall portion that isolates a space on a back side of the negative electrode terminal from a space containing the electricity generating element, wherein in the isolation wall portion, a thinner portion to break open earlier due to increases in gas pressure in the containing space to function as a safety valve is formed groove-like, a groove direction of the thinner portion is the same direction as an orientation of the resin of the gasket, and an Izod impact value of the resin forming the gasket is in a range of 20 to 60 J/m (at a temperature of 23±2° C. and a relative humidity of 50±5%).

By this means, there can be provided an alkaline battery sealing gasket wherein the safety valve function to prevent a burst of the sealed alkaline battery is certainly activated even when the gas pressure inside the battery gradually increases and wherein the high sealability of the battery is maintained for a long time and there can be provided a sealed alkaline battery that is excellent in anti-burst and anti-liquid leakage through using this sealing gasket.

In the above means, preferably a stress relief part shaped like a recess in sectional view is provided in at least one position in the isolation wall portion, and the thinner portion is provided above the stress relief part.

Further, preferably a thickness of the isolation wall portion is from 0.3 to 0.8 mm and a thickness of the thinner portion is from 0.1 to 0.4 mm.

Yet further, preferably a distance of come-close position from a center of the isolation wall portion to the negative electrode terminal is from 1.0 to 3.0 mm.

Preferably the resin forming the gasket comprises mainly polypropylene.

DETAILED DESCRIPTION OF THE INVENTION

Figure 2:
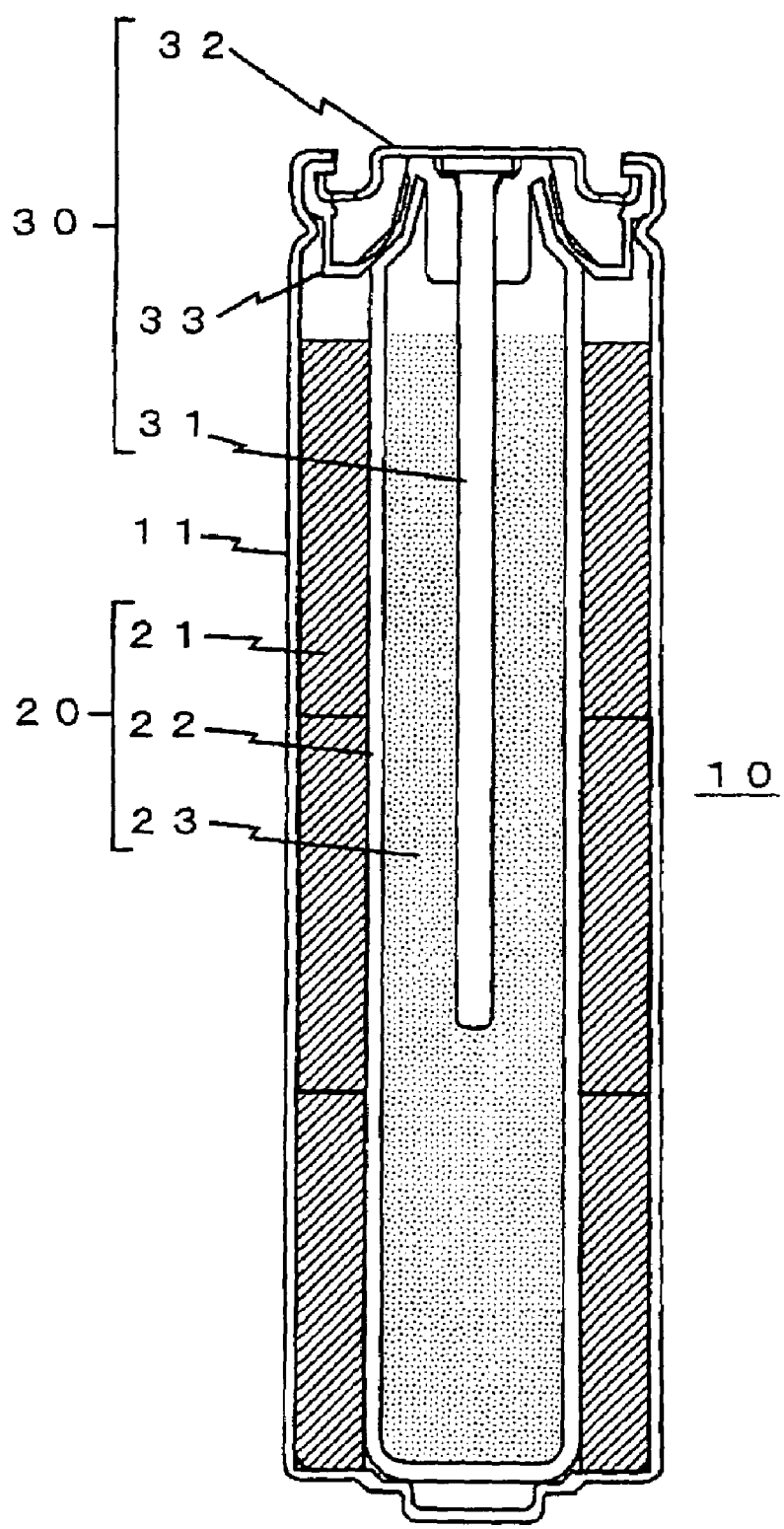
FIG. 2 is a sectional view of an embodiment of the sealed alkaline battery using the sealing gasket of FIG. 1.

First, a battery 10 shown in FIG. 2 is an alkaline dry battery called by the type name of AM, and has an electricity generating element 20 contained in a metal battery can 11 shaped like a bottomed cylinder and has the opening of the battery can 11 sealed by a sealing member 30 in an airtight manner.

The battery can 11 is formed by pressing a nickel-coated thin steel sheet or a metal thin sheet made of nickel-iron alloy or the like, and doubles as a positive electrode terminal. The electricity generating element 20 comprises a positive electrode composite 21 constructed by shaping and solidifying a positive electrode active material including manganese dioxide and the like into a predetermined shape (cylinder), a separator 22 impregnated with alkaline electrolyte, and a negative electrode gel 23. A pole-shaped negative electrode collector 31 is inserted into the negative electrode gel 23.

The sealing member 30 is a composite which is integrated the collector 31, a dish-shaped metal negative electrode terminal 32, and an insulating sealing gasket 33 made of a resin in advance. After inserted into the opening of the battery can 11, the sealing member 30 seals the battery can 11 airtight by tightening the opening. The gasket 33 is sandwiched in a pressed state between the opening end of the battery can 11 and the periphery of the negative electrode terminal 32. Also, it seals the battery can 11 airtight by isolating the space on the back side of the negative electrode terminal 32 from the containing space of the electricity generating element 20.

Furthermore, the gasket 33 has a safety valve function to prevent a burst of the battery 10 by breaking open earlier due to increases in gas pressure inside the battery can 11 containing the electricity generating element 20. The early break-down of the gasket 33 allows gas generated abnormally in the battery 10 to escape through a gas passage (orifice) formed around the periphery of the negative electrode terminal 32 to the outside.

Figure 1:
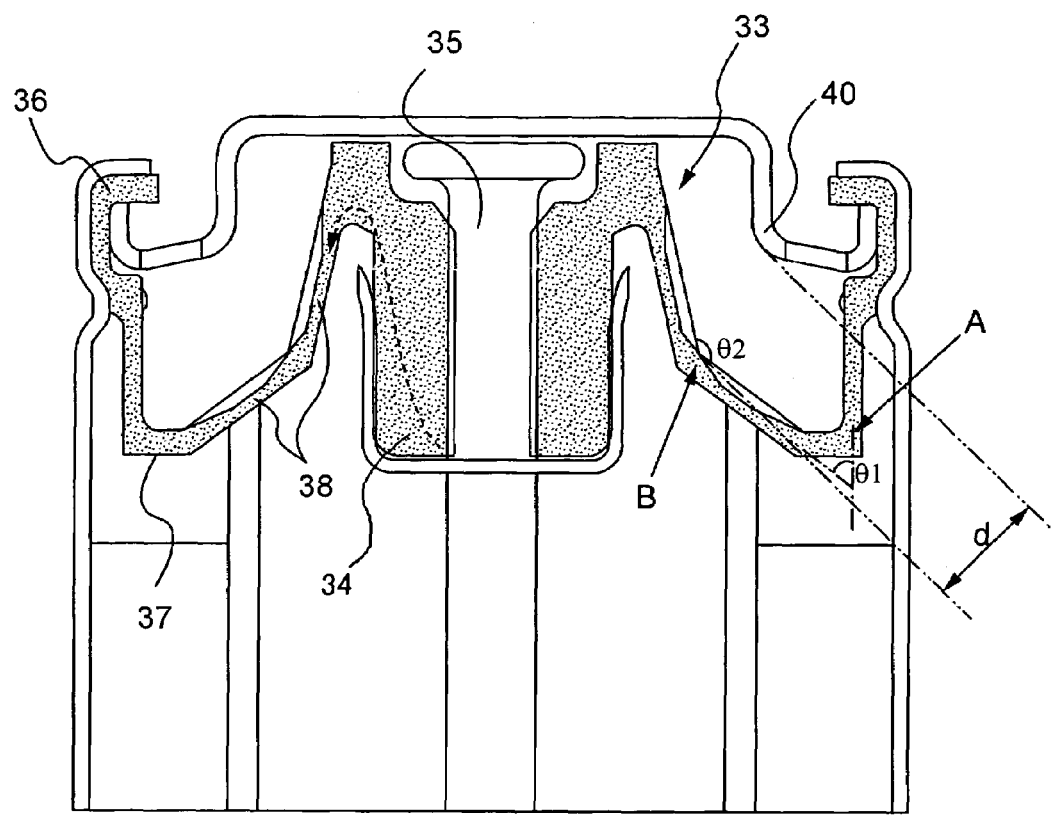
FIG. 1 is an enlarged sectional view of the main part of a sealed alkaline battery using an alkaline battery sealing gasket according to an embodiment of the present invention.

FIG. 1 is a sectional view of the sealing gasket 33 used in the battery 10. The sealing gasket 33 of the Figure is a molded product having a central boss portion 34, a peripheral packing portion 36, and an intermediate isolation wall portion 37 integrally. Also it is made of resin mainly comprising PP (polypropylene). The central boss portion 34 has an aperture 35 through which the collector 31 is inserted in an airtight manner. The peripheral packing portion 36 is sandwiched in a pressed state between the opening end of the battery can 11 and the negative electrode terminal 32, thereby sealing against the opening end of the battery can 11 in an airtight manner.

The intermediate isolation wall portion 37 isolates the space on the back side of the negative electrode terminal 32 from the containing space of the electricity generating element 20. Two stress relief parts A, B are respectively provided on the outer circumference side and the center side of the isolation wall portion 37 to lessen stress exerted in the direction of the inner circumference of the sealing gasket when tightening the opening of the battery can 11 to the negative electrode terminal 32 and the sealing gasket 33. An angle θ1 of the stress relief part A on the outer circumference side, which is an angle θ1 between the vertical portion extending the peripheral packing portion 36 and the sloped part of the isolation wall portion extending the stress relief part B on the center side, is preferably in a range of 30° to 70° depending on the type of battery. Meanwhile, the stress relief part B, which is provided to lessen stress residing in the stress relief part A and the angle θ2 thereof, is preferably in a range of 120° to 170°.

Thinner portions 38 are formed in the isolation wall portion 37 to be like a groove. In other words, the bottom of a groove formed in the isolation wall portion 37 defines the thinner portion 38. Preferably, the thickness of the isolation wall portion is from 0.3 to 0.8 mm and the thinner portion 38 is from 0.1 to 0.4 mm in thickness so as to break open at battery inner pressure of 3 to 6 MPa. The groove direction of the thinner portion 38 in the isolation wall portion is the same direction as the resin orientation (indicated by the broken-line arrow) of the gasket 33. In this case, the gasket 33 has an inlet through which resin is injected when molded, a so-called gate, in the lower end of the central boss portion 34 as seen in the Figure. In the metallic mold, resin injected through this gate flows in the direction of the broken-line in the Figure, so that the gasket 33 is formed. The resin molecules are oriented in the direction of the resin flow when molded.

The thinner portion 38 breaks open earlier when inner pressure, that is, gas pressure in the containing space increases due to gas generation in the battery 10, thereby functioning as a safety valve to allow the gas to escape. That is, when gas is generated inside the battery, gas pressure produced by this acts to swell the isolation wall portion 37 to the negative electrode terminal side. At this time, since the stress relief part B is located in the center of the isolation wall portion 37, the offset amount thereof is at maximum. When the gas pressure rapidly increases, the stress relief part B of the thinner portion 38 breaks open in quick response to this, and thus the thinner portion 38 does not contact the corner 40 of the negative electrode terminal. On the other hand, when the gas pressure inside the battery gradually increases, the stress relief part B also gradually swells and thus, if a distance d between the stress relief art B and the corner 40 of the negative electrode terminal is small, the stress relief part B may contact the corner 40 of the negative electrode terminal before the thinner portion 38 breaks open. If such contact occurs all around the corner 40, it becomes difficult that the thinner portion 38 breaks open as a safety valve. In the worst case, the battery bursts. A method of avoiding such a phenomenon is to enlarge the distance d between the stress relief part B and the corner 40 of the negative electrode terminal, but the enlarging of this distance causes the decrease of the capacity inside the battery and thus the reduction of discharge capacity. For batteries having a small capacity like LR3, this has a large impact. In an example of the present invention, by using a resin having an Izod impact value described later, the distance d between the stress relief part B and the corner 40 of the negative electrode terminal can be set to be in the range of 1.3 to 3.0 mm, preferably, the range of 1.0 to 2.5 mm.

If only the safety valve function is of interest, a high impact-resistant resin having an Izod impact value of 80 to 100 J/m is suitable as the resin for the gasket 33, but as described above, when the gas pressure gradually increases, the safety valve function is not certainly activated due to the creep deformation of the thinner portion 38.

Hence, used for the sealing gasket 33 in this embodiment is a PP resin having an Izod impact value of 20 to 60 J/m (at a temperature of 23±2° C. and a relative humidity of 50±5%), different from the conventional resins. That is, the inventors have acquired knowledge that by using the resin having an Izod impact value of 20 to 60 J/m as the resin for the sealing gasket 33, an optimum state can be achieved where, even when the gas pressure gradually increases, the safety valve function can be activated certainly and in addition the high sealability can be maintained for a long time. By this means, it is possible to certainly activate the safety valve function to prevent a burst of the sealed alkaline battery not depending on how the gas pressure increases, and in addition, to maintain the high sealability of the batteries for a long time. That is, the sealed alkaline battery 10 which is excellent in anti-burst and anti-liquid leakage through using this sealing gasket 33 is obtained.

Examples of the present invention will be described specifically below.

EXAMPLE 1

A polypropylene resin having an Izod impact value of 10 to 18 J/m (at a temperature of 23±2° C. and a relative humidity of 50±5%, hereinafter under the same conditions), a resin of 20 to 30 J/m, a resin of 40 to 60 J/m, a resin of 63 to 80 J/m, and a resin of 85 to 120 J/m were used, and for each resin, a requisite-for-test number of (ten) sealing gaskets in the same shape were made. And with each gasket, a test battery (LR6-type alkaline dry battery) was made and tested for evaluation. The thickness of the isolation wall portion was 0.4 mm and the thickness of the thinner portion was 0.2 mm.

The test was held under the condition of each of temperatures of 20° C., 40° C., 60° C. with respectively charging a constant current of 40 mA, and the activation situation (number of the activated/number of the tested) of the safety valves by the thinner portions and the deformation situation (number of the deformed/number of the tested) of the gaskets were observed. The charging with a constant current is for intentionally generating reactant gas in the batteries, and in order to have the gas to be generated relatively slowly, the current value was set at 40 mA. With this setting, the test was performed to investigate the activation situation of the safety valve function when the gas pressure gradually increased. Table 1 shows the results of this test.

TABLE 1

| Sample group No. | Izod impact value (J/m) | Test temperature (° C.) | Number of activated/ Number of tested | Number of deformed/ Number of tested |
|---|---|---|---|---|
| 1 | 10–18 | 20 | 10/10 | 0/10 |
|   |   | 40 | 10/10 | 0/10 |
|   |   | 60 | 10/10 | 1/10 |
| 2 | 20–30 (The invention) | 20 | 10/10 | 0/10 |
|   |   | 40 | 10/10 | 0/10 |
|   |   | 60 | 10/10 | 1/10 |
| 3 | 40–60 (The invention) | 20 | 10/10 | 0/10 |
|   |   | 40 | 10/10 | 1/10 |
|   |   | 60 | 10/10 | 2/10 |
| 4 | 63–80 (Prior art) | 20 | 8/10 | 2/10 |
|   |   | 40 | 9/10 | 3/10 |
|   |   | 60 | 9/10 | 9/10 |
| 5 | 85–120 (Prior art) | 20 | 8/10 | 5/10 |
|   |   | 40 | 7/10 | 10/10 |
|   |   | 60 | 7/10 | 10/10 |

According to Table 1, the thinner portion of all test samples were broken open to activate the safety valve function for the sealing gaskets (sample group No. 1) made of the resin having an Izod impact value of 10 to 18 J/m, and no samples were failed in the activation. Furthermore, although not shown in Table 1, no battery displayed swelling at all. This is because the activation pressure of the safety valve was too low, that is, because the thinner portion was brittle and easy to break down and hence even if gas pressure in the battery had not increased enough but was within a permissible range, the safety valve was sensitively activated. Hence, even in a normal use state, there is a possibility of the occurrence of liquid leakage due to malfunction of the safety valve. Moreover, these gaskets lack flexibility and thus are not suitable for the sealed alkaline batteries required to maintain the high sealability for a long time.

With the sealing gaskets (sample group Nos. 4 and 5) made of the resin having an Izod impact value of 63 to 120 J/m, there were many test samples whose safety valve function were not activated, and battery swelling was remarkable. This indicates that even if gas pressure was greatly above a permissible range, the thinner portion did not break down and thus the safety valve function was not activated. Also, it was confirmed that since the gas pressure gradually increased, there occurred many cases of deformation of the gasket (especially, the thinner portion) due to the creep.

With the sealing gaskets (sample group Nos. 2 and 3) made of the resin having an Izod impact value of 20 to 60 J/m, there occurred no case that the safety valve function was not activated, and battery swelling was to such a degree that few cases were recognizable. This indicates that the thinner portion broke open to certainly activate the safety valve function and that the activation pressure of the safety valve was appropriate. It was confirmed that there occurred little deformation of the gasket (the thinner portion) due to the creep, and it did not affect, at least, the activation of the safety valve function. Furthermore, it was also confirmed through an accelerated test of the anti-liquid leakage separately that the sealability of the alkaline batteries being good, and the high sealability can be maintained for a long time to an enough degree.

As above, it is revealed that with the sealing gaskets made of the resin having an Izod impact value of 20 to 60 J/m, even when gas pressure inside the battery gradually increases, the safety valve function to prevent a burst of the sealed alkaline battery can be certainly activated, and the high sealability of the battery can be maintained for a long time.

EXAMPLE 2

Samples of sealed gaskets were made such that the groove direction of the thinner portion 38 is perpendicular to the resin oriented direction (the flow direction indicated by the broken-line arrow), and the same evaluation test as for Example 1 was performed. In this case, because the rigidity of the resin in the breaking-open direction of the thinner portion 38 was high and the resin stretched, the safety valve function could not be certainly activated. In order to make sure of the activation, the resin needed to be made brittle. However, it was revealed that with such brittleness, the sealing capability of the sealed gasket was reduced, and a long term high sealability could not be obtained. From this, it is understood that the present invention is effective when the groove direction of the thinner portion is the same direction as the resin orientation of the gasket.

EXAMPLE 3

The same evaluation tests with charging currents of 80 mA and 150 mA were performed using sealed gaskets (sample group Nos. 1 to 5) made same as Example 1. In this case, because the charging currents were large, reactant gas in the battery was generated at relatively high speed, but it was confirmed that the thinner portion broke down at almost the same gas pressure as in Example 1 to perform the safety valve function. That is, whether gas pressure inside the battery increased gradually or rapidly, in each case, the safety valve function was activated at appropriate activation pressures.

According to the present invention, there is provided an alkaline battery sealing gasket wherein the safety valve function to prevent a burst of the sealed alkaline battery is certainly activated even when the gas pressure inside the battery gradually increases and wherein the high sealability of the battery is maintained for a long time, and there is provided a sealed alkaline battery that is excellent in anti-burst and anti-liquid leakage through using the sealing gasket.

What is claimed is:

1. An alkaline battery sealing gasket made of a resin in combination with an alkaline battery comprising:
    a peripheral packing portion sandwiched in a pressed state between an opening end of a metal battery can that contains an electricity generating element and doubles as a positive electrode terminal and a negative electrode terminal so as to seal the opening end with an airtight manner; and
    an isolation wall portion for isolating a space on a back side of the negative electrode terminal from a space containing the electricity generating element,
    wherein in the isolation wall portion, a thinner portion to break open earlier due to increases in gas pressure in the containing space to function as a safety valve is formed groove-like, a groove direction of the thinner portion is in the same direction as an orientation of the resin of the gasket, and an Izod impact value of the resin forming the gasket is in a range of 20 to 60 J/m at a temperature of 23±2° C. and a relative humidity of 50±5%,
    wherein stress relief parts shaped like recesses in sectional view are provided on an outer circumference side of the isolation wall portion with an angle in a range of 30° to 70° and a center side of the isolation wall portion with an angle in a range of 120° to 170°, and the thinner portion is provided above the stress relief parts.

2. The alkaline battery sealing gasket according to claim 1, wherein a thickness of the isolation wall portion is from 0.3 to 0.8 mm and a thickness of the thinner portion is from 0.1 to 0.4 mm.

3. The alkaline battery sealing gasket according to claim 2, wherein a distance of come-close position from a center of the isolation wall portion to the negative electrode terminal is from 1.0 to 3.0 mm.

4. The alkaline battery sealing gasket according to claim 1, wherein the resin forming the gasket mainly comprises polypropylene.

5. A sealed alkaline dry battery, wherein the battery uses the sealing gasket made of a resin according to claim 1.

* * * * *